Oct. 5, 1965            E. R. FISH            3,209,850
TRAILER HAVING LONGITUDINALLY ADJUSTABLE AND DRIVEN REAR WHEELS
Filed Feb. 26, 1963            5 Sheets-Sheet 2
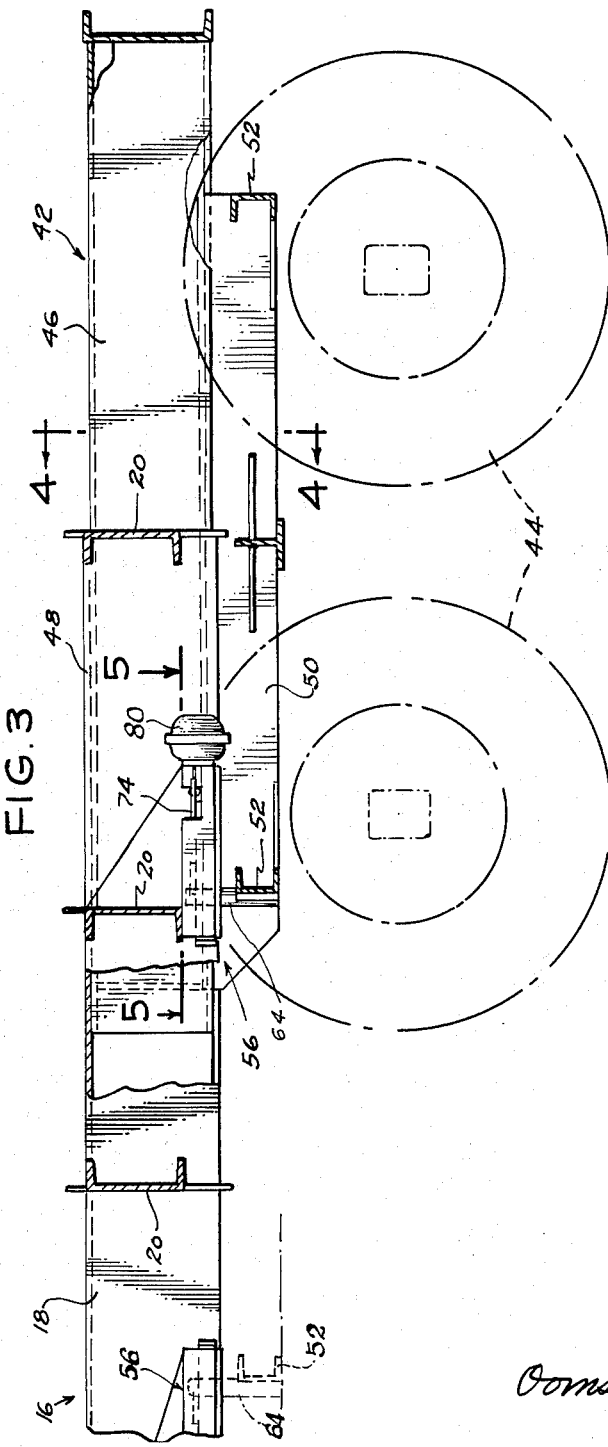
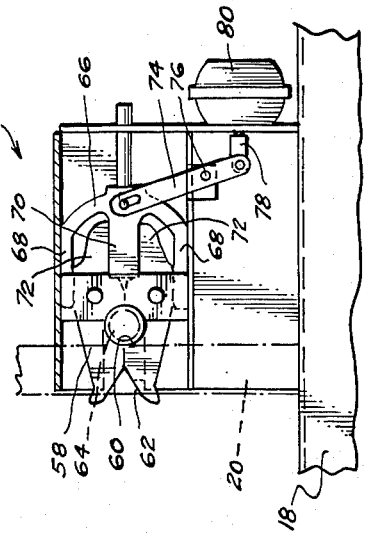
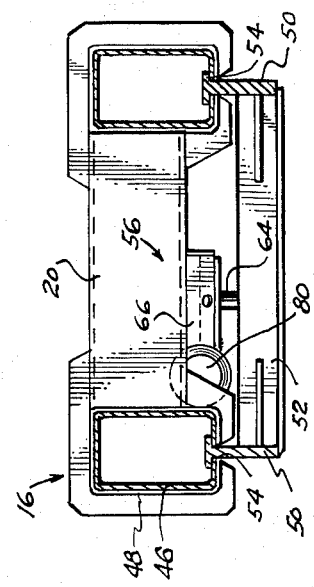
INVENTOR.
*Eldon R. Fish*
BY
*Ooms, McDougall + Hersh*
ATTORNEYS INVENTOR.
Eldon R. Fish
BY
Ooms, McDougall & Hersh
ATTORNEYS Oct. 5, 1965  E. R. FISH  3,209,850
TRAILER HAVING LONGITUDINALLY ADJUSTABLE AND DRIVEN REAR WHEELS
Filed Feb. 26, 1963  5 Sheets-Sheet 4

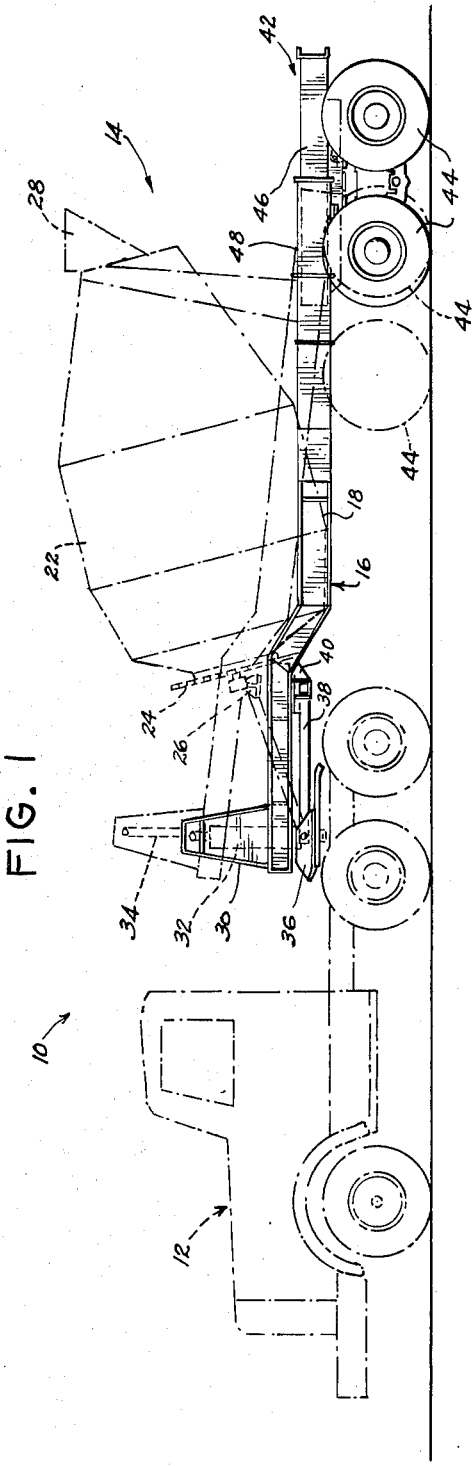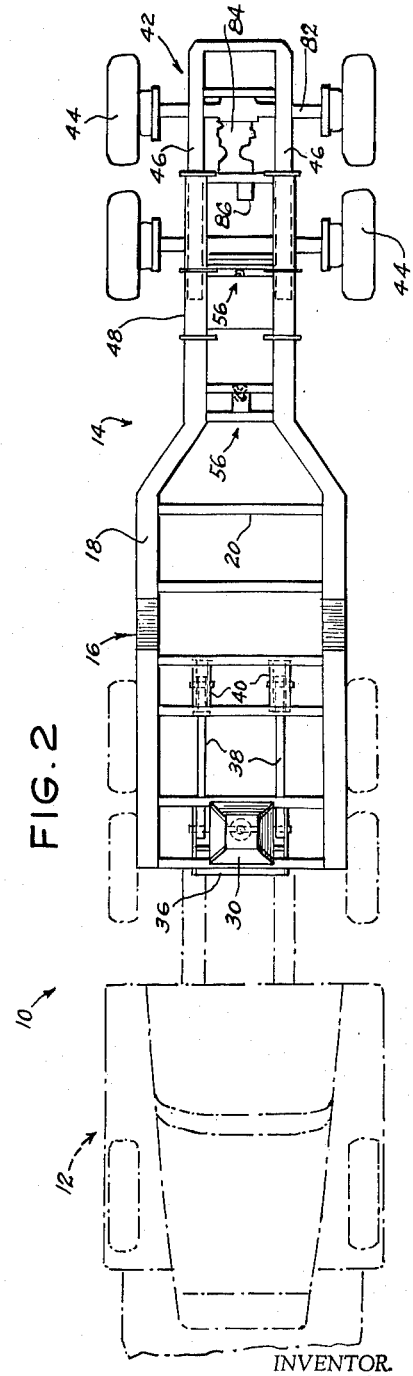

INVENTOR.
Eldon R. Fish
BY
Ooms, McDougall & Hersh
ATTORNEYS

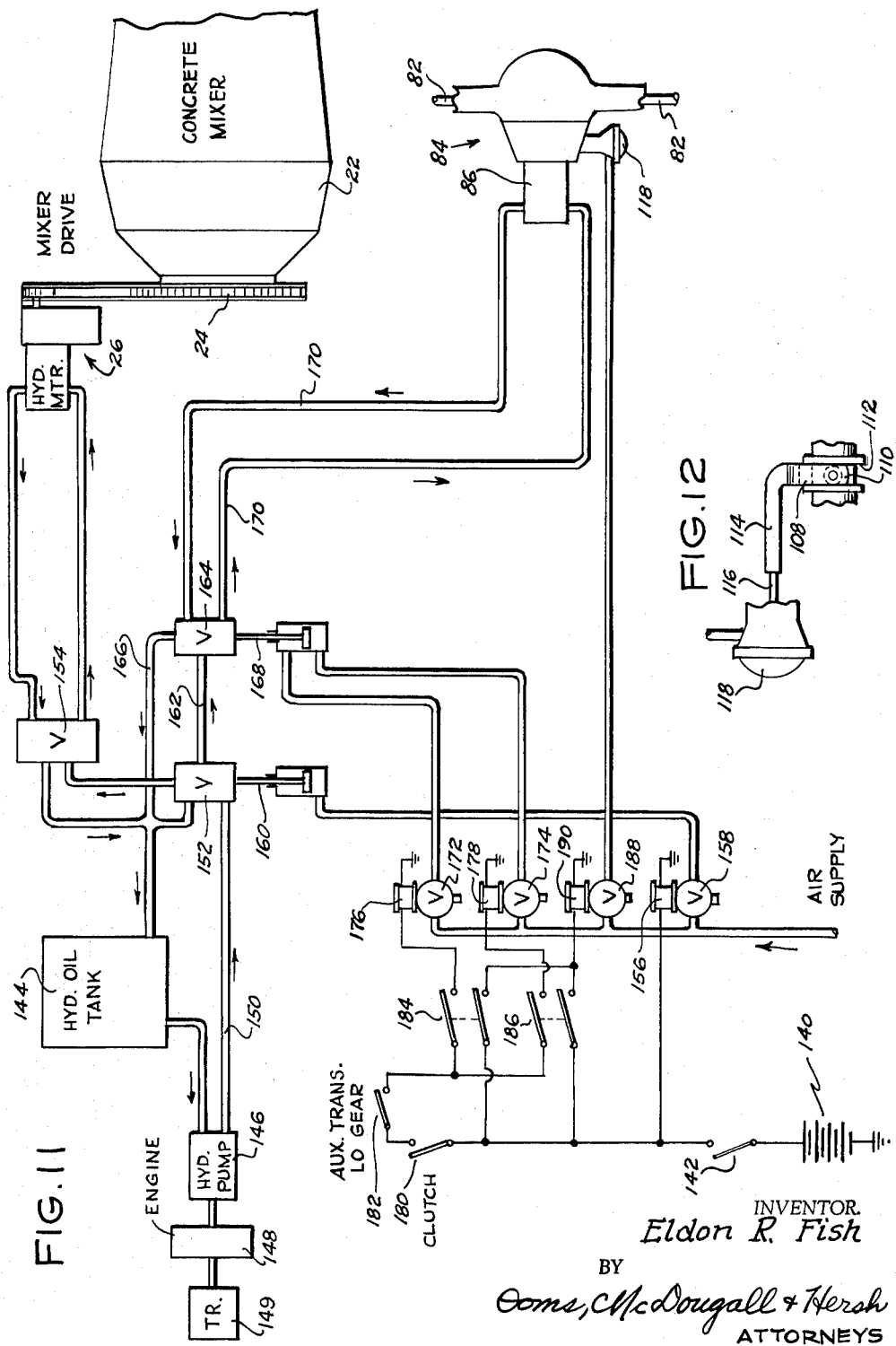

United States Patent Office 3,209,850
Patented Oct. 5, 1965

3,209,850
TRAILER HAVING LONGITUDINALLY ADJUSTABLE AND DRIVEN REAR WHEELS
Eldon R. Fish, Chicago, Ill., assignor to General Dynamics Corporation (Material Service Division), Chicago, Ill., a corporation of Delaware
Filed Feb. 26, 1963, Ser. No. 261,084
6 Claims. (Cl. 180—14)

It is well-known that certain problems arise in the transporting of heavy loads. Thus, the mechanisms in constructions designed for carrying the loads must be capable of moving the constructions with the loads at reasonable rates. The constructions must also be adapted to carry the loads over a wide variety of surfaces. In addition, it is necessary to provide constructions which are capable of meeting various regulations set up by the various agencies controlling traffic throughout the country. It is also an essential requirement in the design of truck constructions to provide means for efficient handling of the materials which are carried on the constructions.

The so-called trailer-mixer represents a type of truck construction which must be designed to accommodate the various situations outlined above. The following specification will refer in particular to a novel truck construction which comprises a trailer-mixer and which includes elements designed to overcome difficulties heretofore encountered in this field. It will be apparent, however, in considering the various features to be described that applications in other fields will also prove feasible.

In the handling of concrete to be transported to a particular site and then poured, it is desirable to provide trailer-mixers which have large capacities. Thus, if a large amount of concrete can be originally loaded, a greater number of jobs can be completed with fewer reloading operations and fewer mixers required. Existing trailer-mixers are capable of handling large amounts of concrete; however, various regulations place limits on the amount of concrete that can be transported over a highway and these limits are usually determined by weight distribution per axle formulas.

It is therefore one object of the instant invention to provide a trailer-mixer construction which includes means for distributing the weight of the construction in a unique manner whereby greater loads can be handled by the construction while remaining within the limits set up by regulating agencies.

It is a related object of this invention to provide a trailer-mixer construction of the type described in the foregoing object which is also capable of handling the concrete carried by the mixer in a highly efficient manner once a job site has been reached.

In the use of trailer-mixer constructions, an additional problem arises since, in many cases, job sites are encountered which require movement of the mixers over terrain other than highways. Thus, in many cases, the mixers must be driven through mud, soft earth and the like; and, therefore, it is desirable to provide means for adapting the constructions for use under such conditions. It is, therefore, an additional object of this invention to provide a unique drive means associated with the construction and capable of increasing the ability of the construction to operate under adverse conditions. The drive means of this invention are particularly adapted to cooperate with constructions of this invention which are designed for carrying heavier loads.

These and other objects and advantages of this invention will appear hereinafter and for purposes of illustration but not of limitation, specific embodiments of this invention are shown in the accompanying drawings in which:

FIGURE 1 is an elevational view of a trailer-mixer construction characterized by the features of this invention;

FIGURE 2 is a plan view of the construction shown in FIGURE 1;

FIGURE 3 is an enlarged fragmentary view, partly in section, illustrating the rear end portion of the construction;

FIGURE 4 is a vertical cross-sectional view taken about the line 4—4 of FIGURE 3;

FIGURE 5 is a detail horizontal cross-sectional view taken about the line 5—5 of FIGURE 3;

FIGURE 11 is a diagrammatic view illustrating the electrical, hydraulic and pneumatic circuitry provided for the construction; and, FIGURE 12 is a detail view of a clutch operating mechanism utilized in the construction.

Figure 6:
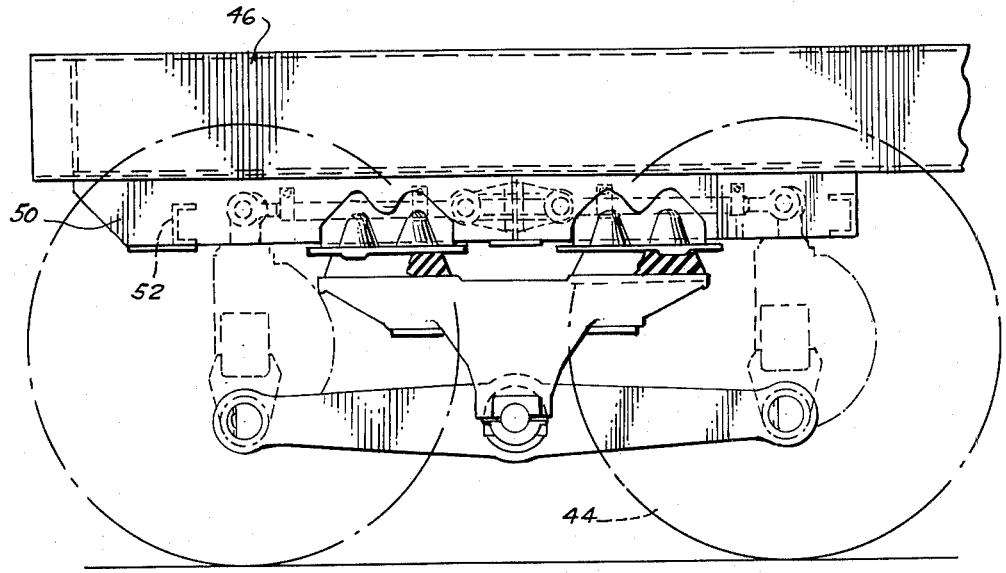
FIGURE 6 is a fragmentary elevational view illustrating the rear frame structure of the trailer-mixer.
Figure 7:
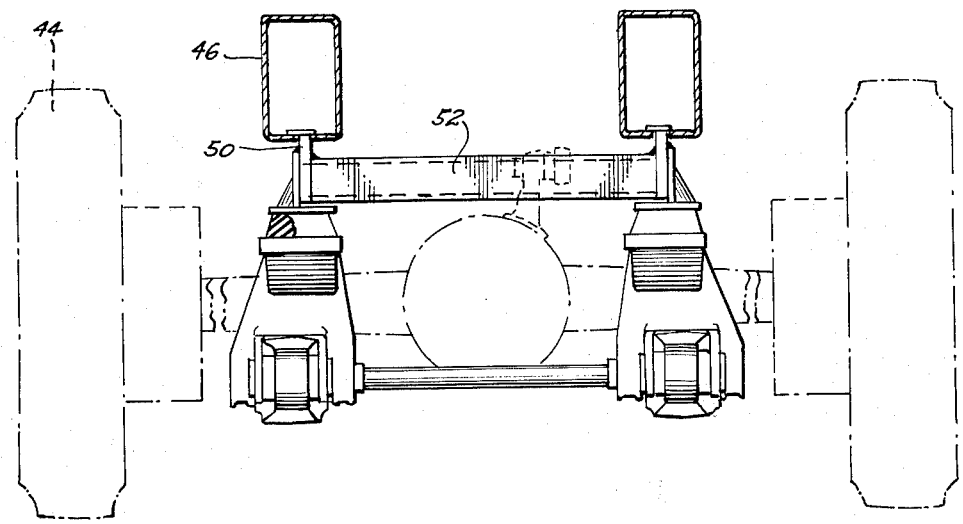
FIGURE 7 is a rear elevational view of the structure shown in FIGURE 6.

The trailer-mixer construction 10 illustrated in FIGURES 1 and 2 includes a tractor portion 12 and a trailer portion generally designated 14. The trailer portion includes a main frame 16 which is defined by means of longitudinally extending frame members 18 and cross bars 20. This arrangement provides a bed portion for supporting rotatable drum 22.

The drum 22 includes a drive gear arrangement 24 which is associated with a hydraulic motor 26. A discharge chute 28 positioned at the rear of the drum is adapted to be moved downwardly whereby the contents of the drum can be removed.

The end of the main frame 16 is provided with a housing 30 which encloses a hydraulic cylinder 32 and associated piston 34. The lower end of the cylinder 32 is pivotally secured to supporting plate 36 mounted on the tractor portion of the construction. Yoke members 38 are pivotally connected to this supporting plate and to the main frame as shown at 40.

Operation of the piston and cylinder illustrated provides for tilting of the main frame to the dotted line position shown. With the discharge chute 28 in the discharge position, removal of the contents from the drum is greatly facilitated through use of this tilting arrangement.

An important feature of the construction of the instant invention comprises the use of an independent supporting frame 42 for the rear wheels 44 of the construction. This supporting frame includes longitudinal members 46 and these members are adapted to be slideably received in hollow interior portions which are formed in the rear sections 48 of the longitudinal members 18 of the main frame. As best shown in FIGURES 3 through 7, the members 46 of the supporting frame include rails 50 which are secured to the members 46 and which extend downwardly therefrom. Cross members 52 connect the opposite rail portions to provide a rigid frame structure.

The rear sections 48 of the longitudinal frame members 18 define longitudinally extending openings 54 in their bottom surfaces. The rails 50 are adapted to be received in these openings whereby sliding movement of the supporting frame relative to the main frame can be accomplished.

Latch means generally designated by the numeral 56 are provided for retaining the supporting frame in forward and rearward positions. The latch means illustrated comprise pivotally supported arms 58 which define an opening 60 when they are in the closed position. The leading ends 62 of the arms are tapered whereby they can be spread apart in response to engagement by the pin 64 associated with the supporting frame 42. In the illustrated embodiment, the pin 64 is secured to the forward cross member 52 of the supporting frame.

A locking means 66 is associated with each of the latch means whereby pivotal movement of the arms 58 can be prevented when the pin 64 is to be held thereby. These locking means include arms 68 which engage the outer surfaces of the arms 58 to prevent pivotal movement of the latter. A centrally disposed portion 70 of the locking means is adapted to be fitted between the extending rear portions 72 of the arms 58 whereby an additional means for preventing pivoting of these arms is provided.

Release of the locking means 66 is effected for removal of the pin 64 from engagement with the latching means. This release is effected through lever 74 which is pivoted at 76 and which is operatively connected to piston 78 of the pneumatically operated mechanism 80. It will be apparent when considering FIGURE 5 that outward movement of the piston 78 will effect movement of the arms 68 and member 70 out of engagement with the arms 58. Release of the pin 64 can then be accomplished by moving the main frame relative to the supporting frame. This latter movement is accomplished by locking the brakes (not shown) associated with the rear wheels of the trailer. Locking of the brakes will hold the supporting frame in a stationary position and the main frame can be moved until the pin 64 is engaged by a latch means. The arms 58 of the latch means are preferably resiliently urged to a closed position whereby the locking means 66 can be moved into position when the pin 64 is fitted within the opening 60.

Figure 8:
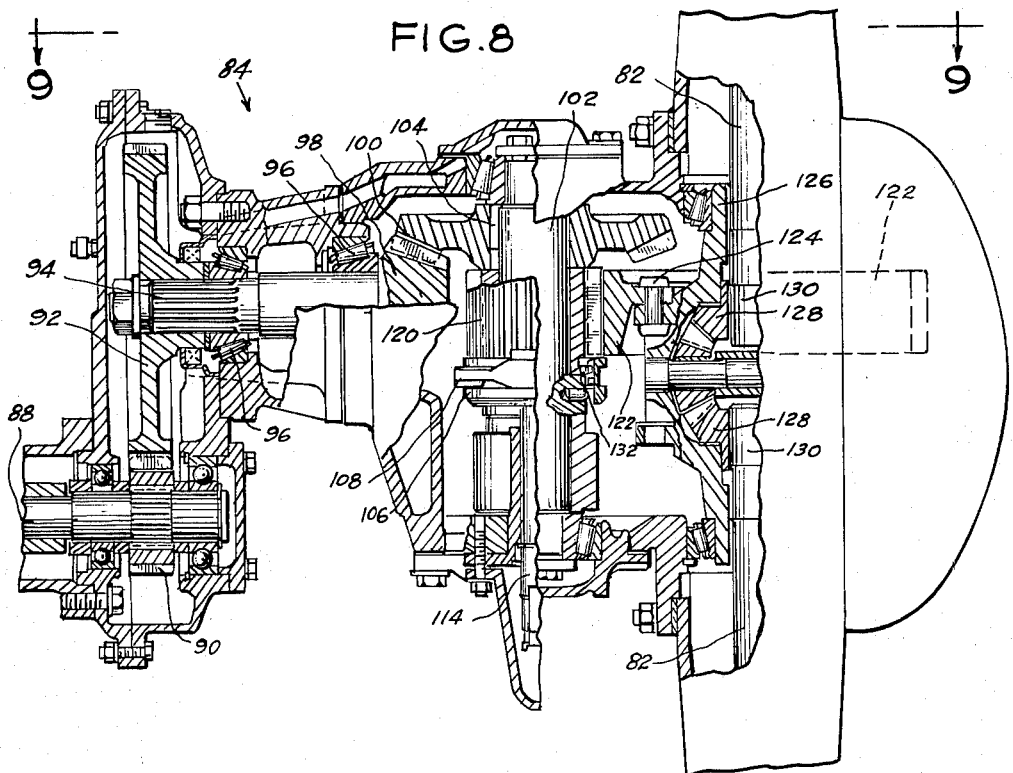
FIGURE 8 is a fragmentary detail view, partly in section, of a clutch mechanism employed in the rear wheel drive of the construction.
Figure 9:
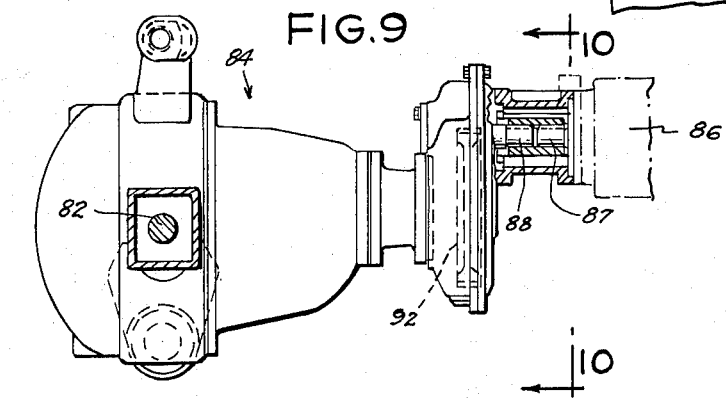
FIGURE 9 is a detail view of the clutch mechanism taken about the line 9—9 of FIG. 8.
Figure 10:
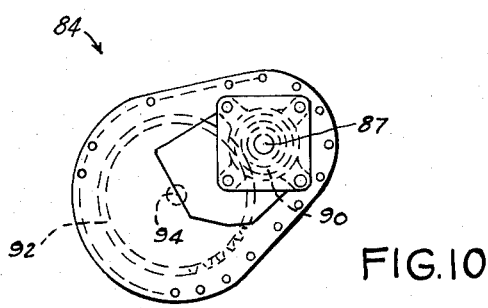
FIGURE 10 is an end view of the clutch mechanism taken about the line 10—10 of FIGURE 9.

As previously indicated, means are provided in the illustrated trailer construction for driving the rear wheels associated with the supporting frame 42. In the illustrated embodiment, the rearward set of the wheels 44 are associated with live or driven axles 82 while the axles of the forward set of the rear wheels are dead. To effect the driving movement, a clutch assembly 84 shown in FIGURES 8 through 10 is associated with the axles 82. A hydraulic motor 86 and the drive shaft 87 thereof are associated with the clutch construction and driving of the axles 82 is effected by means of this motor.

The drive coupling 88 of the clutch mechanism is provided with a drive pinion 90 which is operatively associated with a gear 92 in the clutch mechanism. The gear 92 is in turn connected to splined shaft 94 which is rotatably mounted on bearings 96 and which has a bevel gear 98 fixed at one end. The gear 98 provides for driving of the associated bevel gear 100 and this latter gear is tied to the shaft 102 by means of key 104.

A cylindrical gear 106, which is provided with gear teeth on its inner face, is also tied to the shaft 102; however, this cylindrical gear is adapted to be shifted relative to the shaft 102 by means of fork member 108. As best shown in FIGURE 12, the fork 108 includes arms 110 which fit into the channel 112 defined in the outer face of the cylindrical gear. The fork 108 is connected to shift rod 114 which is in turn connected to the piston 116 of pneumatically operated mechanism 118.

A gear 120, disposed around the shaft 102, is operatively engaged with gear 122 and this latter gear is attached by means of fastener 124 to the cylindrical member 126. This latter member is in turn attached to bevel gears 128 which are fixed to the splined portions 130 of the axles 82.

The cylindrical gear 106 is adapted to effect rotation of the gear 120 when the fork 108 provides for engagement of the teeth on this cylindrical gear with the teeth on the ring 132 associated with the gear 120. These gears are locked in driving position in FIGURE 8 and it will be apparent that shifting movement of the rod 114 will effect disengagement of the cylindrical gear 106 with the ring 132 to provide a neutral position when driving movement of the axles 82 is not to be effected. The clutch construction shown is of the type normally utilized for two-speed operations. Thus, a second gear similar to the gear 120 has been omitted from the shaft 102 whereby a neutral position can be provided in the construction. The use of a modified two-speed clutch in the manner shown has been found to provide a particularly economical and efficient arrangement for the driving of the rear wheels of the trailer.

The particular clutch mechanism described is advantageously adapted for use in combination with circuitry which provides for operation of the clutch mechanism only under certain circumstances. An example of circuitry of this nature is shown in the diagram illustrated in FIGURE 11. This circuitry includes a source of E.M.F. 140 which is connected through toggle switch 142 to solenoids which provide for control of the operation of certain hydraulic and pneumatic components. The toggle switch 142 is maintained in the open position when it is desired to provide for rotation of the mixer drum 22 through hydraulic motor 26. The hydraulic motor is fed fluid from tank 144 while the hydraulic pump 146 associated with tractor engine 148 provides for circulation of fluid through the system. The engine is provided with a standard multi-range transmission 149. With the toggle switch open, the pump 146 is adapted to deliver fluid through line 150 directly to the hydraulic motor 26 since the valves 152 and 154 are set to provide this passage under these conditions. When it is desired to utilize the rear wheel drive operation, the toggle switch 142 is closed whereby current is fed to solenoid 156 thereby opening pneumatic valve 158 and operating piston rod 160 to shift valve 152. Hydraulic fluid is then pumped through line 162 to valve 164.

The valve 164 is provided with outlet line 166 which will return fluid to the tank 144 unless the valve has been operated through piston 168 to open communication with line 170. Operation of the piston 168 is effected by means of pneumatic valve 172, which controls forward movement of the rear wheel drive, or pneumatic valve 174 which controls reverse movement of the rear wheel drive. Opening of either of these valves is effected through energization of one of the respective solenoids 176 or 178. In the example shown, to operate these solenoids, it is first necessary to provide for closing of switch 180 which is only closed when the clutch associated with the tractor engine is in. In addition, switch 182 must be closed and this switch is only closed when the auxiliary transmission of the tractor engine is being utilized.

Double-throw switches 184 or 186 must also be closed in order to effect energization of one of the solenoids 176 or 178. The switch 184 is associated with the forward gear utilized in the low range of the auxiliary transmission while the switch 186 is utilized with the reverse gear in the low range of the transmission. Assuming that a forward drive in the rear wheels is to be effected, the switch 184 will be closed and the solenoid 176 will be energized. This will open valve 172 whereby the piston 168 can effect shifting of valve 164 to feed hydraulic fluid to the hydraulic motor 86 associated with the clutch mechanism 84. As previously explained, however, the axles 82 cannot be driven until the shift rod 114 moves gear 106 into engagement with the gear 120. This shift rod is actuated when the pneumatically operated mechanism 118 is operated through valve 188. The valve 188 is controlled by solenoid 190 which is energized when the switch 184 is closed.

A substantially identical sequence of steps takes place when reverse drive in the rear wheels is desired. However, closing of the switch 186 causes the valve 174 to impart a reverse movement to the piston 168 whereby the direction of the hydraulic fluid fed through the line 170 is reversed. The hydraulic motor 86 will then operate to impart a reverse movement through the clutch mechanism 84.

It is important to note that significant advantages in the operation of trailer-mixer constructions arise as a result of the features described above. The provision of a supporting frame or bogey for the rear wheels of the trailer-mixer enables the use of greater loads when transporting concrete through certain areas of the country. Thus, it will be appreciated that movement of the bogey assembly to the rearward position illustrated in FIGURE 1 will provide a variation in the load distribution on each axle of the construction. It has been found that substantially greater amounts of concrete can be transported with this arrangement since operators can stay within legal load distribution limits by shifting the rear bogey in the manner shown.

Due to the fact that the discharge chute 28 of the drum 22 must be positioned immediately adjacent a delivery point to properly direct the concrete, it is necessary to move the rear bogey forward relative to the main frame. When this is done, the chute 28 will extend beyond the rear end of the trailer and can therefore provide a much more effective discharge of the concrete. The arrangement of this invention therefore provides for increased capacity without detracting from the effectiveness of a concrete pouring operation.

The advantages of the rear wheel drive will also be apparent particularly when it is kept in mind that the constructions of this invention are designed for carrying loads above normal. It will be appreciated however that the features of the drive mechanism described can be utilized in other applications. In this connection, it will be understood that the combination of the rear wheel drive with a multi-range transmission is highly effective, and the type of operating circuit illustrated is eminently suitable for such a combination. The rear wheel drive will be of primary value in situations where it is difficult to obtain sufficient traction through the tractor engine. Such situations arise many times in the handling of concrete since in many instances, the reaching of job sites requires movement over terrain which is not firm enough for providing good traction.

Since the rear wheel drive will be utilized primarily for low-speed operations, it is desirable to provide an automatic cutout of the rear wheel drive whenever the transmission is shifted to a higher speed range. This arrangement prevents overpowering of the hydraulic motor 86 if fluid were being pumped to this motor when the engine 148 was operating at a relatively high speed.

The illustrated example which contemplates use in combination with tractors employing auxiliary transmissions should not be considered to be a limiting situation. Thus, it will be appreciated from the above description that the primary concern is to provide for operation of the rear wheel drive only when the transmission is shifted into a lower range.

It will be understood that various changes and modifications can be made in the truck construction above described which provide the characteristics of this invention without departing from the spirit thereof particularly as defined in the following claims.

I claim:

1. In a trailer-mixer construction wherein said trailer comprises a main frame defining a bed portion for carrying a rotatably driven mixer drum, the improvement wherein said main frame includes longitudinal frame members defining hollow interior portions in the rear sections thereof, a bogey construction for carrying the rear wheels of said trailer, said bogey including longitudinally disposed members adapted to be slideably received within said hollow interior portions, a guide track formed in said main frame, means associated with said bogey for maintaining the bogey on said guide track, latch means for securing said bogey in a forward position and in a rearward position, brake means associated with said rear wheels whereby said main frame can be moved relative to said bogey when said brakes are applied and said latch means are released, and drive means operatively connected to said rear wheels and supported by said bogey whereby driving movement of said rear wheels can be effected.

2. A trailer-mixer construction in accordance with claim 1 wherein said trailer is associated with a tractor having an engine with a multi-range transmission, and including means operatively connected to said transmission adapted to automatically lock out said rear wheel drive means if said transmission is fixed in a range above the low speed range.

3. In a trailer-mixer construction wherein said trailer comprises a main frame defining a bed portion for carrying a rotatably driven mixer drum, the improvement wherein said main frame includes longitudinal frame members defining hollow interior portions in the rear sections thereof, a bogey construction for carrying the rear wheels of said trailer, said bogey including longitudinally disposed frame members having vertical and longitudinal dimensions substantially corresponding to the dimensions of said hollow interior portions, said bogey frame members being received in telescoping relationship within said hollow interior portions, longitudinal rails rigidly secured to said bogey frame members and extending downwardly therefrom, elongated slots defined by the bottom walls of each of said main frame members, said rails being received in said slots and latch means for securing said bogey in a forward position and in a rearward position and brake means associated with said rear wheels whereby said main frame can be moved relative to said bogey when said brakes are applied and said latch means are released.

4. In a trailer-mixer construction wherein said trailer comprises a main frame defining a bed portion for carrying a rotatably driven mixer drum, the improvement wherein said main frame includes longitudinal frame members defining hollow interior portions in the rear sections thereof, a bogey construction for carrying the rear wheels of said trailer, said bogey including longitudinally disposed frame members having vertical and longitudinal dimensions substantially corresponding to the dimensions substantially corresponding to the dimensions of said hollow interior portions, said bogey frame members being received in telescoping relationship within said hollow interior portions, longitudinal rails rigidly secured to said bogey frame members and extending downwardly therefrom, elongated slots defined by the bottom walls of each of said main frame members, said rails being received in said slots and latch means for securing said bogey in a forward position and in a rearward position and brake means associated with said rear wheels whereby said main frame can be moved relative to said bogey when said brakes are applied and said latch means are released, and drive means operatively connected to said rear wheels and supported by said bogey to provide for driving movement of said rear wheels.

5. In a truck construction of the type comprising a main frame defining a bed portion for the carrying of objects thereon and wherein the engine in said construction includes a multi-range transmission, the improvement comprising a separate drive means in said construction, means for effecting driving of the rear wheels of said construction through operation of said drive means, said rear wheels being driven by said drive means through a clutch means, said clutch means including a drive position and a neutral position, means for shifting said clutch means into said neutral position, said last mentioned means being operatively associated with means for operating said drive means and including means in said operating means for preventing shifting into said drive position unless said transmission is fixed in said low speed range, and including means for permitting operation of said drive means to drive said rear wheels only if said transmission is fixed in a low-speed range.

6. A truck construction in accordance with claim 5 wherein said clutch includes a shift rod, and said means for shifting said clutch includes a solenoid actuated, pneumatically operating mechanism.

References Cited by the Examiner

UNITED STATES PATENTS

| | | | |
|---|---|---|---|
| 1,857,249 | 5/32 | Marcum. | |
| 2,161,153 | 6/39 | Gallun et al. | 180—14 |
| 2,384,781 | 9/45 | Rockwell et al. | 180—54 |
| 2,466,938 | 4/49 | Evans et al. | |
| 2,630,871 | 3/53 | Simpkins | 180—14 |
| 2,663,574 | 12/53 | Martin | 280—423 X |
| 2,698,668 | 1/55 | McKay | 180—22 |
| 2,727,758 | 12/55 | Smith | 280—34 |
| 2,733,771 | 2/56 | Sullivan | 180—14 X |
| 2,781,186 | 2/57 | Harbers et al. | |
| 2,829,724 | 4/58 | Burns et al. | 180—53 |
| 2,839,311 | 6/58 | Locker | 280—81 |
| 2,860,891 | 11/58 | Ramun | 280—407 |
| 2,954,834 | 10/60 | Hammar | 180—66 |
| 2,962,295 | 11/60 | Tenenbaum | 280—81 |
| 3,027,962 | 4/62 | Wolf | 180—14 |
| 3,038,704 | 6/62 | Cook. | |
| 3,061,332 | 10/62 | Goulden. | |
| 3,112,100 | 11/63 | Prichard. | |
| 3,126,209 | 3/64 | Jewell et al. | 280—81 |
| 3,146,842 | 9/64 | Nelson et al. | 180—22 |

FOREIGN PATENTS

| | | |
|---|---|---|
| 534,292 | 3/41 | Great Britain. |
| 697,541 | 9/53 | Great Britain. |
| 600,640 | 12/59 | Italy. |

A. HARRY LEVY, *Primary Examiner.*

KENNETH H. BETTS, BENJAMIN HERSH,
*Examiners.*